G. FUSCH.
INJECTOR.
APPLICATION FILED DEC. 16, 1907.
972,846.
Patented Oct. 18, 1910.
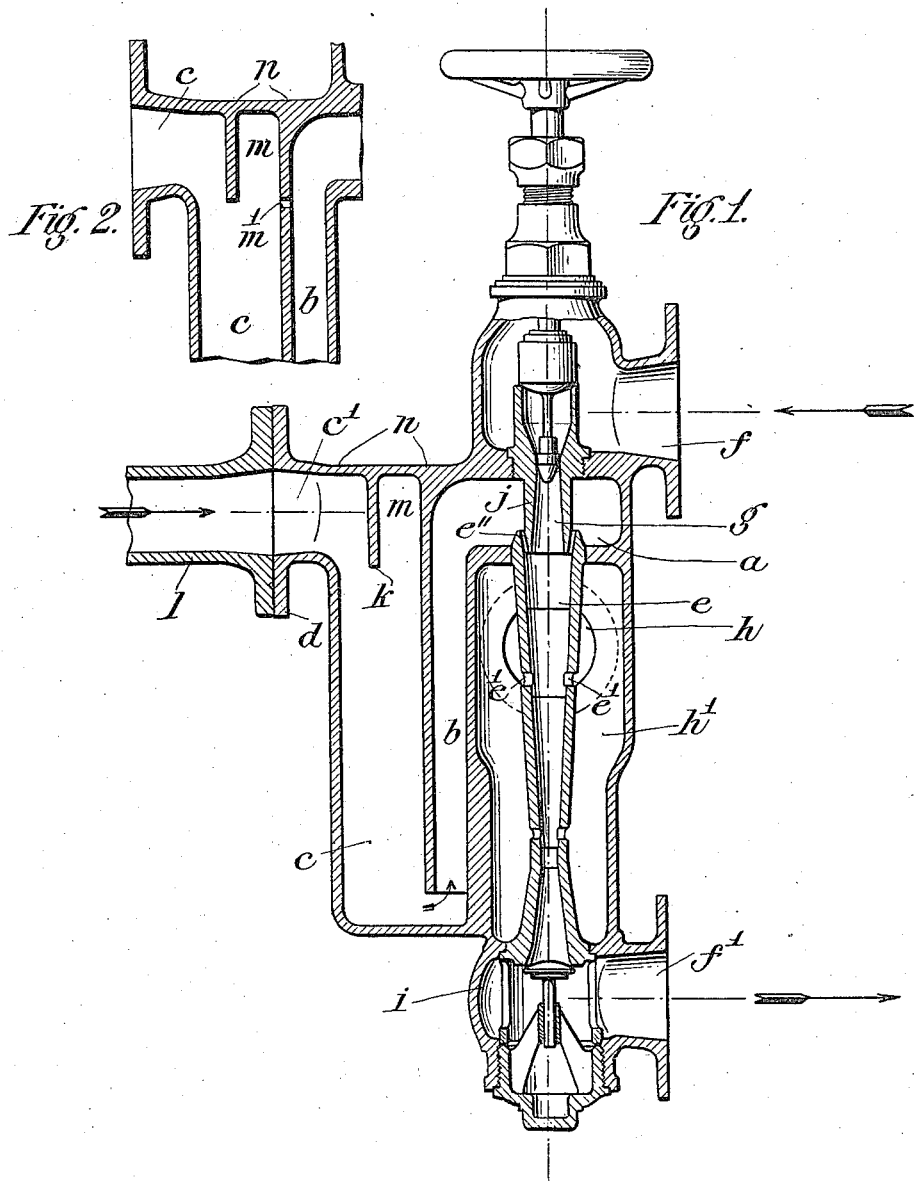

UNITED STATES PATENT OFFICE.

GUSTAV FUSCH, OF HANOVER, GERMANY, ASSIGNOR TO SCHUTTE AND KOERTING COMPANY, OF PHILADELPHIA, PENNSYLVANIA, A CORPORATION OF PENNSYLVANIA.

INJECTOR.

972,846.      Specification of Letters Patent.      Patented Oct. 18, 1910.

Application filed December 16, 1907. Serial No. 406,610.

*To all whom it may concern:*

Be it known that I, GUSTAV FUSCH, a subject of the Emperor of Germany, residing in Hanover, in the Province of Hanover and Kingdom of Prussia, German Empire, have invented a certain new and useful Improvement in Injectors, and of which the following is a true and exact description, reference being had to the accompanying drawings, which form a part thereof.

The present invention relates to injectors, and has for its object to provide in a simple and compact form means whereby momentary interruptions in the flow of the water from the supply source proper are prevented from interfering with the regular and continuous operation of the injector.

The improved injector is primarily intended for locomotive use where the conditions are such that the supply of water to the injector from the tender is subject to frequent interruptions both on account of the change of water level in the tender resulting from the motion of the locomotive and because the shocks and jars to which the locomotive is subjected as it passes over switches, rail joints, etc., frequently interrupts the regular flow of the water through the pipe connections from the tender to the injector.

In carrying out the invention I provide a water reservoir in close proximity to the injector through which the water sucked by the injector through the supply pipe leading from the tender or other source of water supply is drawn. This reservoir is of a capacity sufficient to supply the injector with water during any slight period in which from jars or otherwise the flow of water through the supply pipe is interrupted, and is connected to the suction chamber by such a relatively short conduit that the jars will not interrupt the flow of water through this conduit. By preference, provision is made for an air pocket of definite capacity in said reservoir as this forms a means for regulating the vacuum in the reservoir and regulates the flow of water into the reservoir after the water level therein has been lowered following a momentary interruption of the flow of water through the supply pipe. Owing to the relative small size of the reservoir necessary, it and the air pocket and conduit leading from the reservoir to the suction chamber of the injector may well be formed in one casting with the injector proper, though this is not essential.

The various features of novelty which characterize the invention are pointed out with particularity in the claims annexed to and forming a part of this specification.

For a better understanding of the invention reference may be had to the accompanying drawings and descriptive matter in which I have illustrated one of the forms in which the invention may be embodied.

Of the drawings, Figure 1 is a sectional elevation of an injector having the reservoir formed in the same casting with the injector proper, and Fig. 2 is a partial sectional elevation taken similarly to Fig. 1 showing a modified construction.

In the drawings, $n$ represents the one piece casting having formed in it the steam inlet port $f$ and the water outlet port $f'$ of the condenser proper, the suction chamber $a$, the overflow chamber $h'$ provided with the outlet valve $h$, and the mixing nozzle $e$ provided with waste ports $e'$ which extends through the chamber $h'$ and from the suction chamber $a$ of the condenser to the chamber $i$ from which the outlet port $f'$ leads.

$j$ represents the steam nozzle having its discharge end inserted in the mixing nozzle $e$, and $e''$ represents the port or ports for conveying water from the suction chamber $a$ into the mixing nozzle $e$.

At the side of the chamber $h'$ is located the water reservoir $c$. A channel or conduit $b$ leads from the lower end of the reservoir $c$ to the suction chamber $a$. The water is fed into the reservoir $c$ from the pipe $l$ running to the tender of the locomotive or other source of water which is connected to the casting end so that it discharges into the reservoir $c$ through the inlet port $c'$. As shown, the port $c'$ is located at the extreme upper end of the chamber $c$, and a definite air pocket is formed in the chamber by means of the partition $k$ which projects down from the upper side of the chamber $c$ and divides the upper end of the chamber $c$ into two parts. The exact manner in which this air pocket is formed is of course immaterial, and substantially the same results obtained with the construction shown by the drawings could be had by locating the port $c'$ below the upper wall of the chamber $c$.

In normal operation, water is sucked by the injector into the chamber c through the port c', and from the chamber c through the channel b into the suction chamber a, and from thence into the mixing nozzle e. In case of an interruption in the flow of water through the conduit l from any cause, as by a momentary fall in the supply level or from the shocks and jarring to which the structure is subjected, the stream of water in the mixing chamber e will not be broken because the reservoir c and the relatively short conduit l will still supply water at the proper rate to the suction chamber a. When the water level in the reservoir falls below the normal level under these conditions it increases the vacuum in the reservoir which of itself tends to renew the flow of water into the reservoir from the tender. The pressure of the air in the reservoir c tends to equalize the flow of water through the system, and in particular prevents water from flowing too rapidly to the chamber a when the flow through the pipe starts again after momentary interruption or when without any cessation jars or shocks cause the water to flow faster than is needed through the pipe l. To permit any excess of air drawn into the reservoir, as when the remote end of the pipe l is momentarily opened to the atmosphere, to be gradually drawn out of the reservoir c, restricted ports m' may be provided as shown in Fig. 2, which place the reservoir c in communication with the suction chamber a. This arrangement, of course, reduces the increased vacuum effect occurring when the water level in the reservoir c falls, but may be used with advantage under some circumstances.

With the present invention it will be observed that momentary interruption in the water flow through the pipe l, whether due to a fall in level of the water supply or to the jars and shocks to which the apparatus is subjected, will not result in breaking the jet of water in the mixing nozzle e. Such a result has necessarily followed with the injectors heretofore used regardless of whether or not the injectors were arranged to automatically reëstablish the jet, and whenever the jet of water in the nozzle breaks under such conditions there is an objectionable flooding of the overflow chamber h' and waste of water.

Having now described my invention, what I claim as new and desire to secure by Letters Patent is:

1. The combination with an injector having a steam and water mixing nozzle and a suction chamber in communication with said mixing nozzle, of a storage reservoir, in close proximity to the suction chamber, through which the water passing to the suction chamber is drawn in normal operation, and having an inlet adapted to be connected to the source of water supply and an outlet at its lower end, and a relatively short conduit leading from said outlet to the suction chamber.

2. The combination with an injector having a steam and water mixing nozzle and a suction chamber in communication with said mixing nozzle, of a storage reservoir in close proximity to the suction chamber, a relatively short conduit leading from the lower end of said reservoir to said mixing nozzle, said reservoir having a water inlet adapted to be connected to the source of water supply, and opening to the reservoir substantially above the lower end thereof, and having also provision by which an air pocket is formed in the upper end of said reservoir.

3. The combination in an injector having a mixing nozzle e and a suction chamber a, of the reservoir c having the water inlet c', the conduit b leading from the lower end of the reservoir c to the suction chamber a, and the partition k in its upper end whereby the air pocket m is provided in the upper end of said reservoir.

4. The combination in an injector having a mixing nozzle e and a suction chamber a, of the reservoir c having the water inlet c', the conduit b' leading from the lower end of the reservoir c to the suction chamber a, the partition k in its upper end whereby the air pocket m is provided in the upper end of said reservoir, and the restricted ports m' leading from the reservoir adjacent the mouth of the air pocket to the suction chamber a.

GUSTAV FUSCH.

Witnesses:
MARY SABARTH,
JOHANNES EBERDING,
ROBERT V. BÜLOW.